United States Patent [19]

Shibano

[11] Patent Number: 4,907,611
[45] Date of Patent: Mar. 13, 1990

[54] ULTRASONIC WASHING APPARATUS
[75] Inventor: Yoshihide Shibano, Aikoh, Japan
[73] Assignee: S & C Co., Ltd., Aikoh, Japan
[21] Appl. No.: 130,552
[22] Filed: Dec. 9, 1987

[30] Foreign Application Priority Data

Dec. 22, 1986 [JP] Japan .................................. 197207[U]
Mar. 9, 1987 [JP] Japan ......................................... 53543
Jul. 23, 1987 [JP] Japan ........................................ 184568

[51] Int. Cl.⁴ .............................................. B08B 3/10
[52] U.S. Cl. ...................... 134/60; 134/108; 134/109; 134/184
[58] Field of Search ................. 134/60, 108, 105, 184, 134/109

[56] References Cited

U.S. PATENT DOCUMENTS

| | | | |
|---|---|---|---|
| 2,514,471 | 7/1950 | Calhoun | 68/355 |
| 3,085,948 | 4/1963 | Kearney | 134/108 X |
| 3,292,576 | 12/1966 | Lindemann | 134/105 X |
| 3,308,839 | 3/1967 | Barday | 134/108 X |
| 3,632,480 | 1/1972 | Surprenant | 134/105 X |
| 3,873,071 | 3/1975 | Tatebe | 134/184 X |
| 4,014,751 | 3/1977 | McCord | 134/108 X |
| 4,333,485 | 6/1982 | Karlsson et al. | 134/184 X |
| 4,409,999 | 10/1983 | Pedziwiatr | 134/184 X |
| 4,763,677 | 8/1988 | Miller | 134/184 |

Primary Examiner—Frankie L. Stinson
Attorney, Agent, or Firm—Cushman, Darby & Cushman

[57] ABSTRACT

Disclosed is an improvement of ultrasonic washing apparatus comprising at least one washing vessel, an ultrasonic vibrator for radiating ultrasonic wave into the washing bath, an oscillator for operating the ultrasonic vibrator and degassing means for removing dissolved air and other gases from the washing liquid, thereby enhancing cavitation in the washing bath when the ultrasonic wave is radiated therein, said degassing means including gas separating means and barrier means for preventing surrounding air from dissolving into the washing liquid while it is degassed. Thanks to deaeration in the washing bath cavitation can be used to its full extent in removing soil from a soiled object in the washing bath.

5 Claims, 4 Drawing Sheets

ULTRASONIC WASHING APPARATUS

BACKGROUND OF THE INVENTION

The present invention relates to an ultrasonic washing apparatus for removing oil and other soil from an object to be cleaned, particularly to an ultrasonic washing apparatus making full use of cavitation produced in the washing bath, thereby substantially increasing the washing effect.

FIELD OF THE INVENTION

Washing method and apparatus using ultrasonic vibration have been widely used. Cavitation produced in the washing bath is effective in removing soil from the object to be cleaned compared with washing under static pressure and washing under resonant condition.

The cavitation phenomenon is supposedly produced as follows:

When the ultrasonic wave is produced in the liquid bath, the liquid is subjected to drastic reduction of pressure in different places, causing formation and growth cavities there. As the next moment these cavities are collapsed to provide extremely high pressure spots.

The cavitation phenomenon, however, has not been theoretically elucidated, and requirements for effectively producing cavitation in liquid are not determined. There are some hypothetical descriptions: first, the liquid contains minute air bubbles, which constitute cores for producing cavitation. Specifically, such minute air bubbles expand at the time of reduction of pressure therearound, and then the resultant cavities collect the gas which is dissolved in the liquid. When these cavities suffer compression at the time of increase of pressure therearound, the extremely high pressure spots result. According to this hypothetical description the cavitation phenomenon is difficult to appear in a degassed liquid.

Second, when the ultrasonic wave is produced in liquid, drastic reduction of pressure is caused under certain conditions, and then the liquid pressure is reduced to the saturation vapor pressure at the temperature of the liquid, thus causing vapor in the liquid and hence producing gaseous bubbles, which constitute cores, later developing into cavities. When these cavities are compressed, extremely high pressure spots result. According to this hypothesis gas need not be contained in liquid. Further according to this hypothesis the existence of gas in liquid makes it difficult to cause drastic reduction of pressure, and hence cavitation in the liquid. Another hypothesis, which has not been supported by many people, describes that cavitation is caused by deficient molecules. Requirements for cavitation depend on which hypothesis is adopted. Hitherto, the first hypothesis has been adopted, and accordingly conventional ultrasonic washing apparatuses have been designed as follows: It comprises a series connection of washing vessels each equipped with a vibrator for producing ultrasonic wave in the washing liquid and an associated oscillator for operating an associated vibrator. The multi-stage washing apparatus is not designed for degassing washing liquid. Each washing vessel has a pump for circulating the washing liquid and a filter for removing oil and any impurities from the washing liquid in the course of circulation. Also, a regenerating vessel is used for removing oil and any impurities from the washing liquid, and then the regenerated washing liquid is supplied to the washing vessel. Thus, the impurity-free washing liquid is supplied the the washing vessel all the time. Ultrasonic washing, however, has been effected without removing dissolved gas from the washing liquid.

The inventor carried out many experiments with conventional ultrasonic washing apparatuses as described above to find that no satisfactory washing can be attained. When an object to be cleaned was thrown into a washing vessel, an ultrasonic vibrator in the washing vessel started operation, and then countless air bubbles appeared around the vibrator to rise up to the surface of the washing bath. While air bubbles were rising up, they struck against the object in the washing bath to remove oil and soil from the surface of the soiled object. The washing effect or soil-removing capability of the washing liquid, however, reduced with time, and satisfactory cleaning could not be attained. Such a situation would be supposedly impossible if enough cavitation to remove the soil from the object were produced in the washing bath. The inventor has realized that if ultrasonic wave is radiated in a washing liquid having air or other gases dissolved therein, enough cavitation cannot be produced in the washing bath, and that countless gaseous bubbles lowers the soil-removing effect of cavitation on the soiled object. In fact, when a piece of surface-eroded aluminum foil was thrown into the washing bath, and when an associated ultrasonic vibrator worked to cause countless gaseous bubbles to appear around the vibrator, no discernible change, however, appeared on the eroded surface of the aluminum foil after a long time. The appearance of countless air bubbles indicated that the washing bath had air dissolved in saturation.

The object of the present invention is to provide an improved ultrasonic washing apparatus equipped with means to make full use of cavitation in the washing bath, specifically degassing means, thereby substantially improving the ultrasonic washing effect.

To attain this object there is provided according to the present invention an ultrasonic washing apparatus comprising at least one washing vessel at a single or multi-washing stages, each containing a washing liquid for washing an object to be cleaned when thrown into the washing vessel, an ultrasonic vibrator for radiating ultrasonic wave into the washing liquid and an oscillator for operating the ultrasonic vibrator characterized in that it further comprises degassing means for removing gas from the washing liquid, thereby enhancing cavitation in the washing liquid when the ultrasonic wave is radiated therein, said degassing means including gas separating means and barrier means for preventing surrounding air from dissolving into the washing liquid while it is degassed.

Also, there is provided according to the present invention an ultrasonic washing apparatus comprising at least one washing vessel, each containing a washing liquid for washing an object to be cleaned, an ultrasonic vibrator for radiating ultrasonic wave into the washing liquid and an oscillator for operating the ultrasonic vibrator characterized in that it further comprises degassing means for removing gas from washing liquid, thereby enhancing cavitation in the washing liquid when the ultrasonic wave is radiated therein, said degassing means comprises a boiling vessel, which is put on the washing liquid supplying side of the washing vessel, and in which boiling vessel dissolved gases whose boiling point is lower than the boiling point of the washing liquid can be separated from the washing liquid.

Also, there is provided according to the present invention an ultrasonic washing apparatus comprising at least one washing vessel containing a washing liquid for washing an object to be cleaned when thrown into the washing vessel, an ultrasonic vibrator for radiating ultrasonic wave into the washing liquid and an oscillator for operating the ultrasonic vibrator characterized in that it further comprises degassing means for removing gas from the washing liquid, thereby enhancing cavitation in the washing liquid when the ultrasonic wave is radiated therein, said degassing means comprising a boiling vessel, which is put upstream of the washing bessel on the washing liquid supplying side, said boiling vessel being effective in removing from the washing liquid a gas whose boiling point is lower than the boiling point of the washing liquid, whereby the degassed washing liquid is supplied from the boiling vessel to the ceiling part of the washing vessel to form a high-temperature zone in the washing vessel; and that it further comprises an overflow vessel downstream of the washing vessel, a circulating pipe connecting the overflow vessel to a lower-temperature zone near the bottom of the washing vessel and a regenerating pipe connecting the washing zone between the high-temperature and low-temperature zones of the washing vessel to the vaporizing vessel, whereby the amount of washing liquid which overflows from the high-temperature zone of the washing vessel to the overflow vessel, is made to return to the washing vessel through the circulating pipe: and the washing liquid is directed from the washing vessel to the vaporizing vessel through the regenerating pipe.

In operation of the first invention a washing liquid having gases dissolved therein is supplied to the degassing unit all the time to separate the gases from the washing liquid. The gases are separated from the washing liquid, while preventing surrounding air and other gases from dissolving into the washing liquid, thereby reducing the gas content to possible minimum. The washing liquid having little air and gas dissolved therein is returned to the washing vessel. This process is repeated continuously so that the washing liquid without air or gas dissolved therein is supplied to the washing vessel all the time.

Thus, the ultrasonic vibrator can work in the gas-free washing bath. Then, the washing bath will experience reduction of pressure in different places, and the washing liquid will be vaporaized to produce cavities where saturated vapor pressure has been reached at the surrounding temperature in the washing bath. Thus, cavities can be formed in the washing liquid without air or gas dissolved therein. In the air-free washing bath there are no air bubbles which otherwise, would appear if air were dissolved in the washing liquid. Accordingly cavitation will be effectively produced compared with that which would be produced with accompanying air bubbles. Also, impulsive energy which is released when cavities are broken under compression, will be effectively used in removing oil and soil from the object in the washing bath. Because there are no air bubbles to absorb such impulsive energy.

In operation of an ultrasonic washing apparatus according to the second invention the washing liquid having gases dissolved therein is directed continuously from the vaporizing vessel to the degassing means in the form of boiling vessel after passing through the vapor condensing vessel and the dewatering unit. In the boiling vessel the dissolved gases whose boiling point is lower than the boiling point of the washing liquid are separated from the washing liquid, and then the so degassed washing liquid is returned to the washing vessel after being transformed into gaseous phase. This process is repeated, and the washing vessel is filled with the washing liquid having no gases dissolved therein.

Then, the ultrasonic vibrator is operated to radiate ultrasonic wave into the washing bath. As a result the washing bath suffers reduction of pressure in different places, in which the saturated vapor pressure has been reached to make washing liquid vaporize, thereby producing cavities. Thus, cavitation is effectively produced. No air bubbles appear to suppress cavitation. Also, the impulsive energy which will be released when cavities are collapsed under compression will be effectively used in removing the oil and soil from the soiled object because of no air bubbles for absorbing such impulsive energy.

In operation of an ultrasonic washing apparatus according to the third invention the washing gas having air or gases dissolved therein is directed continuously from the vaporizing vessel to the boiling vessel via the vapor condensing pipe and the dewatering unit.

Specifically in the boiling vessel the dissolved gases whose boiling point is lower than the boiling point of the washing liquid are separated from the washing liquid. Then, the degassed washing liquid at a relatively high temperature is supplied to the washing vessel to form a high-temperature zone on the surface of the washing bath, thereby constituting a barrier for preventing surrounding air and gases from dissolving into the washing bath. When an object to be cleaned is thrown into the washing vessel, the washing liquid of the same amount as the volume of the object overflows from the high-temperature zone of the washing vessel into the subsequent overflow vessel. Then, the washing liquid is returned to the bottom part of the washing vessel via the circulating pipe to form a relatively low-temperature zone near the bottom of the washing vessel. The intermediate zone between the upper, high-temperature zone and the lower, low-temperature zone constitutes a washing zone, which contains much more oil and other soil separated from the object by ultrasonic vibration than the other zones. The oil or water-abundant washing liquid is directed from the washing zone to the vaporizing vessel via the regenerating pipe, which is immersed in the washing zone.

The circulating pipe has a temperature controlling pipe branching away therefrom and extending to the low-temperature zone of the washing vessel. The washing liquid is controlled in temperature by passing through the temperature controlling pipe, and therefore the temperature of the washing liquid in the low temperature zone is kept at a temperature which is appropriate for washing. Also, the amount of soil precipitated and contained in the bottom part of the washing vessel is reduced relative to the amount of washing liquid in the low-temperature zone by supplying soil-free washing liquid from the high-temperature zone to the low-temperature zone of the washing vessel.

The advantage of an ultrasonic washing apparatus according to the present invention are as follows:

As regards the ultrasonic washing apparatus according to the first invention the washing liquid is degassed under the condition in which air and surrounding gases are prevented from dissolving into the washing liquid.

Thus, the deaeration effect on cavitation is distinguishable from that which would be caused if degassing were effected under the condition in which surrounding air and gases are allowed to dissolve into the washing liquid. Accordingly satisfactory washing efficiency will be assured for predetermined factors, such as immersion time in which an object is put in the washing bath, washing times, radiation time of ultrasonic wave etc.

No air bubbles will appear, and therefore cavitation will not be hindered. Accordingly the washing efficiency will be improved so that the number of the washing stages may be reduced, still assuring satisfactory washing results. Thus, a multi-stage washing apparatus can be reduced in size, and the washing cost can be substantially saved.

As regards the ultrasonic washing apparatus according to the second invention the advantages additional to those which are described above are: simple degassing unit is used, compared with that which is used in the first invention. Specifically a boiling vessel is used as a degassing unit, thereby permitting the reduction of the whole washing system in size, and accordingly permitting the saving of manufacturing cost and space as required.

As regards the third invention the washing liquid which is degassed in the boiling vessel, is supplied to the washing vessel to form on the surface of the washing bath a barrier layer around the boiling point of the washing liquid, thereby preventing the surrounding air or gases from dissolving into the washing bath. The washing bath under the overlying barrier is kept at a relatively low temperature by circulating washing liquid through cooling means, thereby increasing the washing efficiency. Also, the circulation of washing liquid is effective in reducing the soil-to-washing liquid ratio in the washing bath.

Other objects and advantages will be apparent from the following description of preferred embodiments, which are shown in the accompanying drawings.

Figure 1:
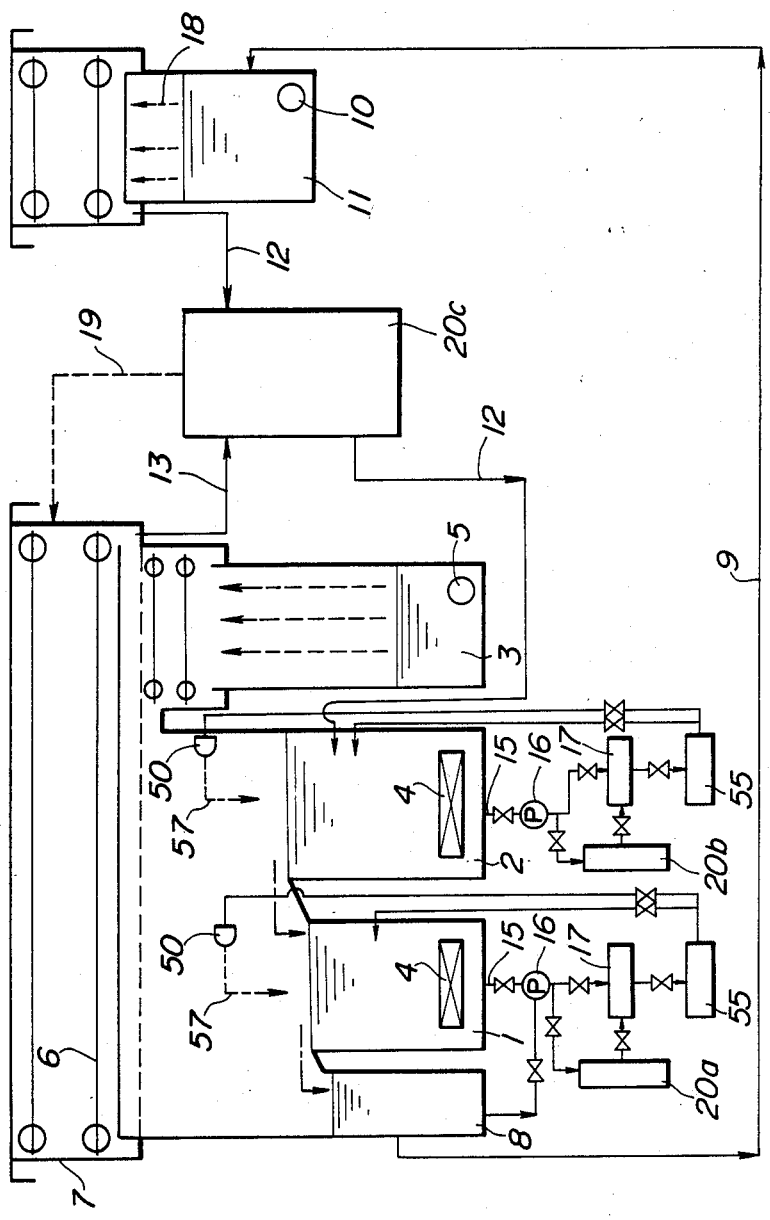
FIG. 1 shows schematically an ultrasonic washing apparatus according to the first embodiment.

Ultrasonic washing apparatuses according to the preferred embodiments of the present invention will be described below with reference to accompanying drawings.

Referring to FIGS. 1 to 4, there is shown an ultrasonic washing apparatus according to the first embodiment of the present invention. It comprises a multi-stage washing vessel system. Washing vessels are indicated at reference numerals 1, 2 and 3. Each of the washing vessels 1 and 2 has a piezoelectric type ultrasonic vibrator 4, which is connected to an oscillator (not shown). The washing vessel 3 has a heater 5, and is used as a steam washing vessel. Above the washing vessels 1, 2 a;nd 3 there is a vapor condenser 7 with a cooling pipe 6 therearound. There is an overflow vessel 8 downstream of the washing vessel 1. A regenerating vessel 11 equipped with a heater 10 is connected to the overflow vessel 8 via a regenerating conduit 9 and to the washing vessel 2 via another regenerating conduit 12.

In this particular embodiment each of the washing vessels 1 and 2 has a filtering pipe 15 extending from the bottom to the top of each vessel and having a pump 16 and a filter 17 both connected therein. The structure as described so far is known as a conventional multi-stage piezoelectric type washing system. In operation objects to be washed will be put in the washing vessel 1, and then the ultrasonic wave generator 4 starts working for washing. Thereafter, the objects will be taken out of the washing vessel 1 and put in the washing bath in the subsequent washing vessel 2 at the second washing stage. Then, the objects will be shifted to the steam washing vessel 3 at the third stage for steam washing. On the other hand the washing liquid is circulated through the filtering pipe 15 by the pump 16. In the course of circulation foreign substances such as dust and oil are removed from the washing liquid.

As is well known, the overflowing liquid flows from the washing vessel 1 to the overflow vessel 8, and then the washing liquid flows to the regenerating vessel 11 through the regenerating pipe 9. In the regenerating vessel 11 the washing liquid is heated by the heater 10 for separation of detergents in terms of different boiling points. Then, the separated detergent liquids are supplied to the washing vessel 1 and 2.

The washing apparatus described above is improved according to the present invention as follows:

Deaeration units 20a, 20b and 20c may be put in the detergent channel, for instance, in the filtering conduit 15 and/or regenerating conduit 9 and/or 12, thereby removing air bubbles from the detergent under the condition in which surrounding air is excluded.

Deaeration units 20a, 20b and 20c can be put at a desired position in the washing liquid line, but preferrably these units are put in the places where the washing liquid is supplied to the washing vessels 1, 2 and 3. In this particular embodiment the first, second and third deaeration units 20a, 20b and 20c are put respectively in the filtering pipe 15 on the washing liquid supplying side with respect to the washing vessel 1, in the filtering pipe 15 on the washing liquid supplying side with respect to the washing vessel 2, and in the regenerating pipe 12, which communicates the regenerating vessel 11 with the washing vessel 2. The inventor realized that deaeration units 20a, 20b and 20c should be capable of performing separation of air bubbles under the air-isolating condition. In view of the fact that deaeration units are most likely to work at normal temperature under normal surrounding atmosphere, preferrably deaeration units may be modified as shown in FIG. 2.

Figure 2:
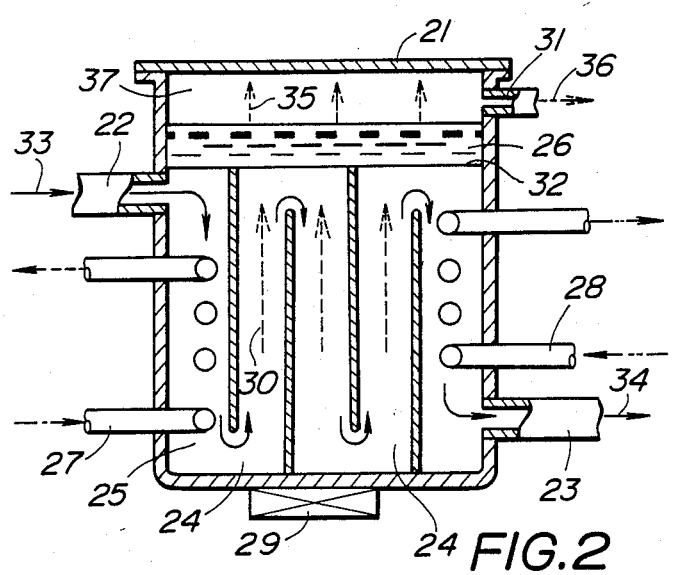
FIG. 2 is a longitudinal section of a degassing unit which may be used in the washing apparatus of FIG. 1.

FIG. 2 shows the first modification as comprising a closed casing 21, a washing liquid inlet channel 22 provided to one side of the casing, a washing liquid outlet channel 23 provided to the opposite side of the casing, a plurality of baffles 25 arranged between the inlet and outlet channels, thermal medium circulating pipes 27 and 28 near the inlet and outlet channels and ultrasonic vibrator 29 on the bottom of the casing. The ultrasonic vibrator 29 for use in deaeration is connected to an exterior oscillator. As shown, a layer of non-soluble liquid 26 such as water lies on the washing liquid bath. In this modification while the washing liquid is flowing the inlet 22 to the outlet 23 in the direction as indicated by arrows 33 and 34, the washing liquid is heated by the thermal medium circulating pipes 27 and 28, and at the same time, the washing liquid is subjected to vibration by the ultrasonic vibrator 29. Then, the gas which is dissolved in the washing liquid is transformed into bubbles, which will come up in the washing liquid as indicated by arrow 30 to pass through the overlying water layer 26. Then, the gas is allowed to escape from the ceiling space 37 to the atmosphere via the vent 31 as indicated by arrows 35 and 36. As the surface 32 of the washing bath is isolated from the remaining air in the ceiling space of the closed casing 21 by the non-soluble liquid layer, the deaeration can be conducted under the air-isolating condition.

The deaerated washing liquid is returned to the washing vessels 1 and 2. The inventor confirmed that ultrasonic vibration causes cavitation at an increased efficiency in the deaerated washing liquid.

Figure 3:
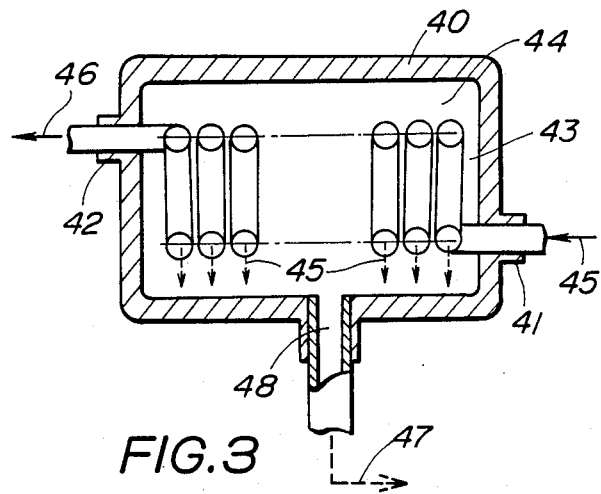
FIG. 3 is a longitudinal section of another degassing unit which may be used in the washing apparatus of FIG. 1.
Figure 4:
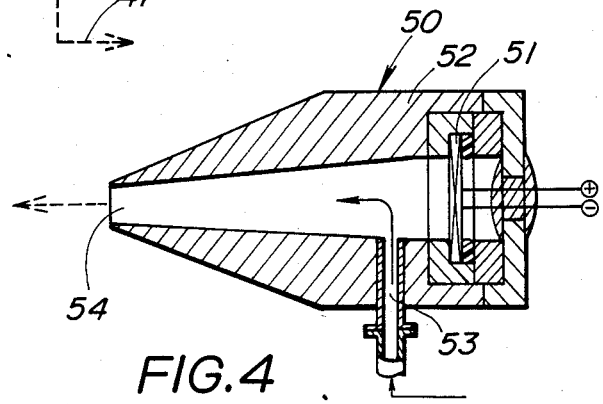
FIG. 4 is a longitudinal section of a liquid vaporizing unit which is used in producing cold vapor after degassing in the washing apparatus in FIG. 1.

FIG. 3 shows another modification of deaeration unit. As shown, a closed casing 40 has a coiled tube which is made of gas-liquid separating membrane such as Teflon 43 connecting the washing liquid inlet 41 to the washing liquid outlet 42. The inside of the casing 40 is evacuated by a vacuum pump, thereby keeping the inside space in vacuum. Thus, while the washing liquid is flowing from the inlet to the outlet in the coiled tube 43 of gas-liquid separating membrane, the gas which is dissolved in the washing liquid, will be drawn out as indicated by arrows 45 and 46 to escape from the vent 48 as indicated by arrow 47. The deaerated washing liquid is returned to the washing vessels 1 and 2. Again, the inventor confirmed that ultrasonic vibration causes cavitation at an increased efficiency in the deaerated washing liquid.

The above description is directed to the cavitation in the washing vessels 1 and 2. As shown in FIG. 1 in the regenerating vessel 11 the washing liquid is evaporated as indicated by arrow 18, and then the vapor is condensed. The so regenerated washing liquid is supplied to a third deaeration unit 20c, which is put in the regenerating pipe 12 extending from the regenerating vessel 11 to the washing vessel 2. A deaeration unit similar to those shown in FIGS. 2 and 3 may be used as the third deaeration unit 20c. After the generated washing liquid has been deaerated under the air-isolating condition, it flows to the washing vessel 2. Specifically the gas which is removed from the washing liquid, is supplied to a cooling-and-condensing unit 7 at a level above the washing vessel as indicated by arrow 19. Then, in the cooling-and-condensing unit 7 the vapor of the washing liquid and the gas removed from the washing liquid are condensed, and the condensed liquid is returned to the third deaeration unit 20c as indicated by arrow 13, and finally the deaerated washing liquid is supplied to the washing vessels 1 and 2 through the regenerating pipe 12.

In FIG. 1 ultrasonic vaporizers are indicated at 50. As is shown in detail in FIG. 4, in the body 52 of the vaporizer a piezoelectric vibrator 51 is included. The vibrator is adapted to be connected to an exterior oscillator. Also, the body 52 has an inlet 53 and an outlet 54. In operation the washing liquid is supplied to the inlet 53 via the filtering pipe 15 (See FIG. 1). The inner pressure will be drastically reduced when the ultrasonic vibrator 51 starts vibration, thereby causing the washing liquid to evaporate. Then, the vapour of the washing liquid ejects from the outlet 54 of the vaporizer 50. As shown in FIG. 1, the ultrasonic vaporizers are positioned above the washing vessels 1 and 2. A cooling unit 55 is put in the washing liquid circulating line, which includes the filtering pipe 15 of the washing vessel 1 or 2. Thus, a part of the deaerated, cooled washing liquid is supplied to the inlet of each ultrasonic vaporizer 50. As indicated by arrow 57, the vapor of washing liquid, which is of high density and is heavier than air, is ejected to the washing liquid bath in each of the washing vessels 1 and 2. Thus, the vapor layer of washing liquid is formed on the surface of the washing bath all the time. Therefore, the invasion of air into the washing bath is prevented, thereby providing the air-isolating condition under which good deaeration is assured.

The inventor has found that one example of washing liquid as appropriate for use in a washing system according to the present invention is Flon 1.1.3. As is known, if the washing liquid of Flon 1.1.3 is put in contact with surrounding atmosphere, air will be dissolved in the washing liquid at an increased rate, compared with the rate at which air can leave the washing liquid. Therefore, the washing liquid is saturated with air all the time. Flon 1.1.3 can be used, however, as washing liquid in a washing system according to the present invention, in which deaeration is conducted under the air-isolating condition. Also, the following substances may be used as washing liquid: Flon 1.1.2, isopropylalcohol (IPA), ethanol, methylene chloride, tricrene, perchloroethylene, 1.1.1-trichloroethane, and azeotropes of these substances, and water.

The inventor carried out experiments, using Flon 1.1.3. A piece of eroded aluminum foil was subjected to ultrasonic washing without deaeration for a week to find that little change was discernible on the eroded surface of the aluminum. Also, a piece of eroded aluminum foil was subjected to ultrasonic washing with deaeration according to the present invention to find that eroded skin started stripping only 30 seconds after the beginning of the experiment.

In the former experiment when the ultrasonic vibrator worked, uncountable air bubbles appeared to come up to the surface of washing bath. It looked like enhancement of cavitation. In fact, aeration rather than cavitation was enhanced, and aeration effect is useless in removing stains from stained object in contrast to cavitation, which is useful in cleaning by compressing air bubbles at an increased pressure with the aid of ultrasonic wave and by removing stains from the object with energy released at explosion of air bubbles. Deaeration of washing liquid is useful in enhancing cavitation available in cleaning.

Figure 5:
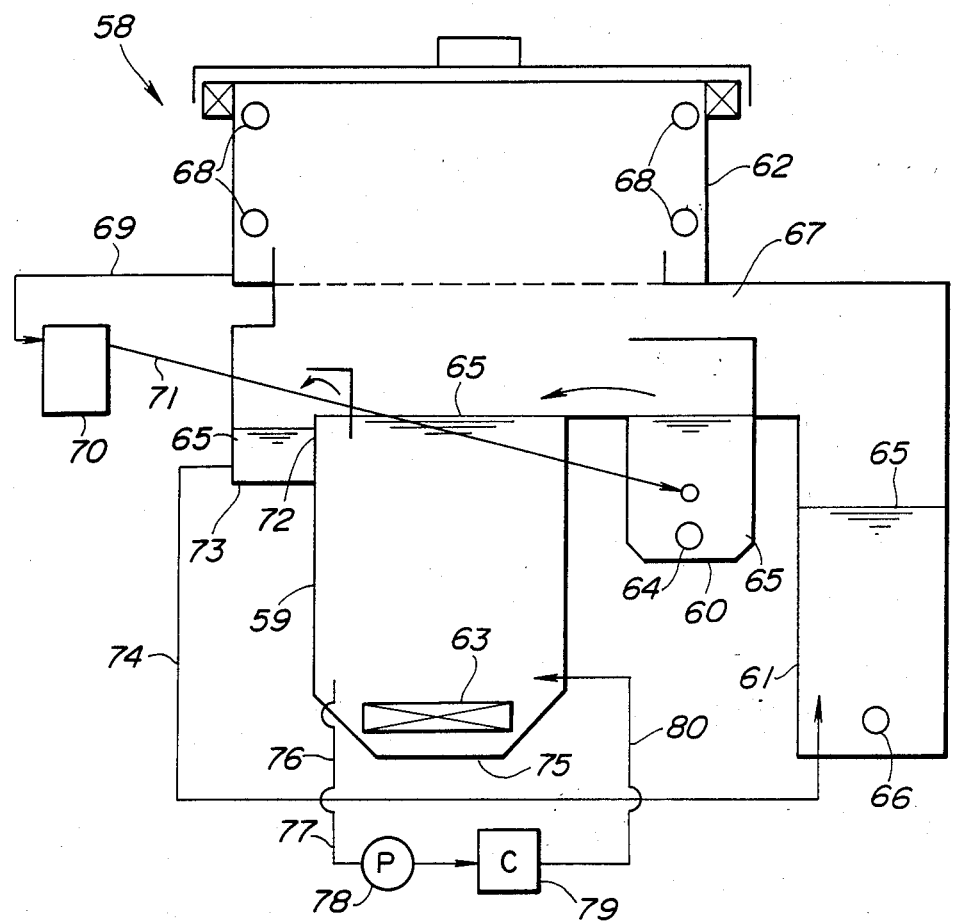
FIG. 5 shows schematically an ultrasonic washing apparatus according to the second embodiment.

FIG. 5 shows an ultrasonic washing apparatus 58 according to the second embodiment of the present invention as comprising: a washing vessel 59, a boiling vessel 60, a vaporizing vessel 61 and a vapor condensing vessel 62.

The ultrasonic washing apparatus 58 includes a single washing vessel 59, which is equipped with a piezoelectric type ultrasonic vibrator 63. The piezoelectric type ultrasonic vibrator 63 is connected to an oscillator (not shown).

As shown, the boiling vessel 60 is put upstream of the washing vessel 59. The boiling vessel to is equipped with a heater 64 for heating the washing liquid around its boiling point. Among other washing liquids Flon 1.1.3 is used in this particular embodiment. This washing liquid 65 has a boiling point at 47.6 degrees Centigrade, and therefore, the heater is designed to heat the washing liquid 65 around approximately 47 degrees Centigrade. In boiling the washing liquid the gases which are dissolved in the washing liquid will be separated if their boiling points are lower than that of the washing liquid.

The vaporizing vessel 61 is put upstream of the boiling vessel 60. The vaporizing vessel 61 is equipped with a heater 66 for heating the washing liquid 65 above its boiling point.

There is the vapor condensing vessel 62 at a level above the washing vessel 59, the boiling vessel 60 and the vaporizing vessel 61. The vapor condensing vessel 62 is equipped with vapor condensing pipes 68 therearound.

After the vapor is condensed into the washing liquid, it is supplied to a dewatering unit 70, in which water particularly (water attached to an object before thrown into the washing vessel 59) is removed. The dewatered washing liquid 65 flows into the boiling vessel 60 via the guide pipe 71. Then, foreign substances having boiling points below that of the washing liquid are separated in the boiling vessel, and the impurities-free washing liquid is supplied to the washing vessel 59. As shown, an overflow vessel 73 is put downstream of the washing vessel 59. When an object to be cleaned is thrown into the washing vessel 59, the washing liquid of the same volume as the object has is made to overflow into the overflow vessel 73. Then, the overflowing amount of washing liquid is supplied to the vaporizing vessel 61 through the regenerating pipe 74.

As shown, a filtering pipe 77 is fixed to the bottom 75 of the washing vessel 59 at one end as indicated at 76 and at the other end as indicated at 80, including a pump 78, a filter (not shown) and a cooling unit 79.

While the washing liquid is circulating through the filtering pipe 77 with the aid of the pump 78, dust, oil and the like are removed from the washing liquid, and at the same time the heat which is generated by ultrasonic vibration in the washing bath is taken away from the washing liquid by the cooling unit, thereby keeping the washing liquid at a given constant temperature.

Washing liquid other than Flon 1.1.3 may be used, as for instance follows: Flon 1.1.2, isopropylalcohol (IPA), ethanol, methylene chloride, tricrene, perchloroethylene, 1.1.1-trichloroethane and azeotropes of these substances, and water.

This particular embodiment uses a single washing vessel 59, but a plurality of washing vessels may be used.

The operation of the ultrasonic washing apparatus is described below.

First, an object to be cleaned is thrown into the washing vessel 59, and then the ultrasonic vibrator 63 starts working. The overflowing amount of washing liquid is shifted from the washing vessel 65 to the overflow vessel 73 when the object is thrown into the washing vessel 59. The washing liquid is directed from the overflow vessel 73 to the vaporizing vessel 61 through the collecting pipe 74. The washing liquid is heated by the heater 66 in the vaporizing vessel 61 to produce the vapor of washing liquid, which is supplied to the condensing vessel at a level as indicated at 67. Then, the vapor is cooled and transformed into washing liquid by the condensing pipes 68 in the vapor condensing vessel 62. The washing liquid is directed to the dewatering unit 70 via the connecting pipe 69, and then water is removed from the washing liquid.

The dewatered washing liquid 65 is directed to the boiling vessel 60 through the guide pipe 71 to be heated by the heater 64 in the boiling vessel 60. Then, the gases which are dissolved in the washing liquid can be separated if the gases have boiling points lower than the boiling point of the washing liquid. The degassed washing liquid is supplied to the washing vessel 59.

The above process is repeated, and degassed washing liquid is continuously supplied to the washing vessel 59, so that enhanced cavitation may be produced in the washing bath by generating ultrasonic vibration with the ultrasonic vibrator 63. Accordingly washing efficiency increases.

In this particular embodiment while the washing liquid is circulated through the filtering pipe 77 by the pump 78, dust, oil and other foreign substances are removed from the washing liquid by the filter, and at the same time the heat which is produced in the washing liquid by ultrasonic vibration is taken away by the cooling unit 79, thereby keeping the washing liquid at a given constant temperature. This contributes the enhancement of cavitation, and accordingly cleaning effect. In this particular embodiment a boiling vessel 60 is used for deaeration, and a single washing vessel 59 is used. A plurality of washing vessels, however, may be used.

Thanks to the use of a boiling vessel 60 for deaeration the structure of the whole apparatus can be simple, and still advantageously it requires only a small space. This space saving will be more conspicuous in case of the multi-stage washing system composed of a series connection of washing apparatuses 58.

Figure 6:
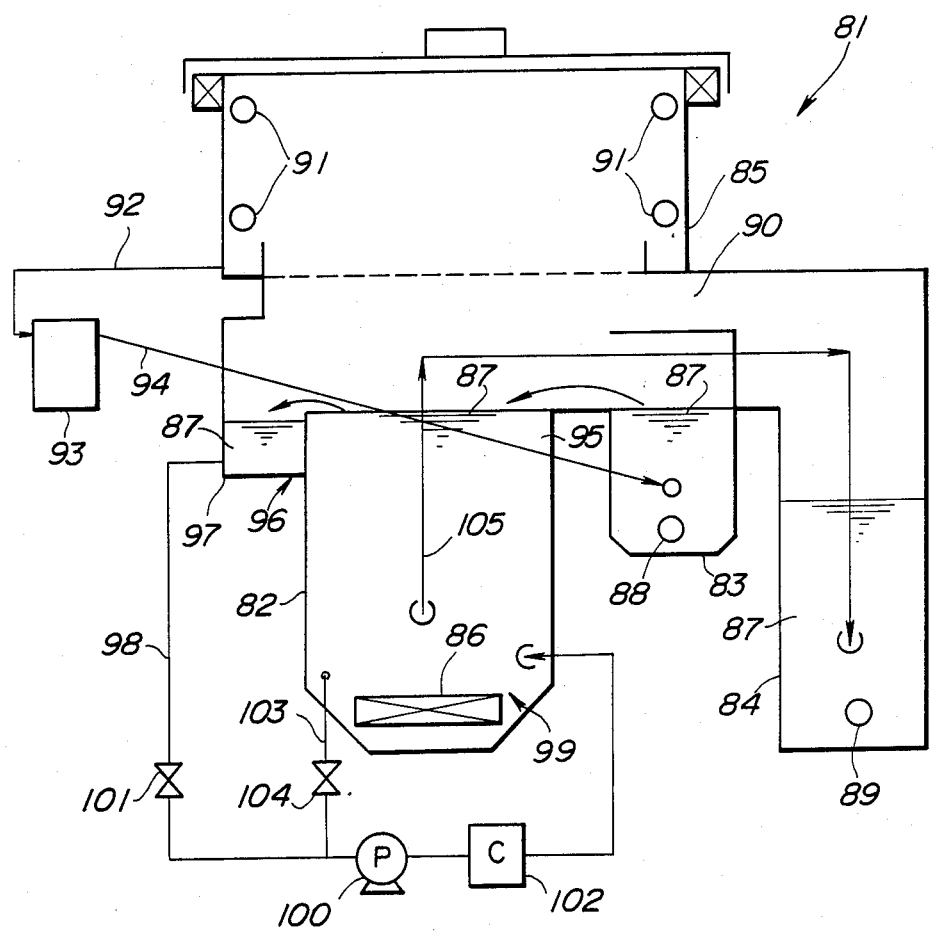
FIG. 6 shows schematically an ultrasonic washing apparatus according to the third embodiment.

FIG. 6 shows an ultrasonic washing apparatus 81 according to the third embodiment of the present invention as comprising: a washing vessel 82, a boiling vessel 83, a vaporizing vessel 84 and a vapor condensing vessel 85.

The ultrasonic washing apparatus 81 includes a single washing vessel 82, which is equipped with a piezoelectric type ultrasonic vibrator 86. The piezoelectric type ultrasonic vibrator 86 is connected to an oscillator (not shown).

As shown, the boiling vessel 83 is put upstream of the washing vessel 82. The boiling vessel 83 is equipped with a heater 88 for heating the washing liquid 87 around its boiling point. Among other washing liquids Flon 1.1.3 is used in this particular embodiment. This washing liquid 87 has a boiling point at 47.6 degrees Centigrade, and therefore, the heater is designed to heat the washing liquid 87 around approximately 47 degrees Centigrade. In boiling the washing liquid the gases which are dissolved therein will be separated if their boiling points are lower than that of the washing liquid.

The vaporizing vessel 84 is put upstream of the boiling vessel 83. The vaporizing vessel 84 is equipped with a heater 89 for heating the washing liquid 87 above its boiling point.

The vapor condensing vessel 85 lies at a level above the washing vessel 82, the boiling vessel 83 and the vaporizing vessel 84. The vapor condensing vessel 85 is equipped with vapor condensing pipes 91 therearound.

After the vapor is condensed into the washing liquid 87, it is supplied to a dewatering unit 93, in which water (particularly water attached to an object before thrown into the washing vessel 59) is removed. The dewatered washing liquid 88 flows into the boiling vessel 83 via the guide pipe 94. Then, foreign substances having boiling points below that of the washing liquid are separated in the boiling vessel 83, and the impurities-free washing liquid is supplied to the washing vessel 82. Thus, a layer of washing liquid around its boiling point extends over the upper surface of the washing bath, thereby forming a high-temperature zone as indicated at 95.

The high-temperature zone around the boiling point of the washing liquid is effective in preventing gases from dissolving into the underlying washing bath, thereby providing an air-barrier, and hence assuring enhancement of cleaning effect. An overflow vessel 97 is put downstream of the washing vessel 82 as indicated at 96. The washing vessel 82 is filled with the washing liquid to its brim, and therefore, when an object to be cleaned is thrown into the washing vessel, the washing liquid of the same volume as the object has is made to overflow into the overflow vessel 97. Then, the washing liquid is directed to the bottom of the washing vessel 82 through the circulating conduit 98 as indicated at 99. A pump 100 is connected in the circulating conduit 98. A valve 101 is connected to the pump on its primary side, and a filter (not shown) and a cooling 102 are connected to the pump on its secondary side.

Thus, in contrast with the high-temperature zone in the top part of the washing vessel as indicated at 95 a low-temperature zone is formed in the bottom part of the washing vessel as indicated at 99. As shown, a temperature controlling pipe 103 branches off from the circulating conduit 98 between the pump 100 and the valve 101. The temperature controlling pipe 103 has a temperature controlling valve 104.

The washing liquid bath sandwiched between the high-temperature zone and the low-temperature zone is communicated with the vaporizing vessel 84 through the regenerating tube 105. The washing liquid which is supplied to the vaporizing vessel 84 is heated above its boiling point by the heater 89, and then the washing liquid is evaporated.

While the washing liquid is circulating through the circulating pipe 98 with the aid of the pump 100, dust, oil and the like are removed from the washing liquid 87, and at the same time the heat which is generated by ultrasonic vibration in the washing vessel is taken away from the washing liquid 87 by the cooling unit 102, thereby keeping the washing liquid at a given constant temperature.

Washing liquid other than Flon 1.1.3 may be used, as for instance follows: Flon 1.1.2 isopropylalcohol (IPA), ethanol, methylene chloride, tricrene, perchloroethylene, 1.1.1-trichloroethane and azeotropes of these substances, and water.

This particular embodiment uses a single washing vessel 82, but a plurality of washing vessels may be used.

The operation of the ultrasonic washing apparatus is described below.

First, an object to be cleaned is thrown into the washing vessel 82, and then the washing liquid 87 overflows into the overflow vessel 97. The washing liquid is directed to the bottom part 99 of the washing vessel 82 through the circulating pipe 98.

The washing liquid is transported from the washing zone of the washing vessel 82 to the vaporizing vessel 84 through the regenerating pipe 105. The washing liquid thus transferred to the vaporizing vessel is heated by the heater 89. Then, the resultant vapor rises to the overlying vapor condensing vessel 85 so that it is reduced to liquid phase around the condensing pipes 91. Then, the washing liquid is directed to the dewatering unit 93 through the connecting pipe 92. After the water is removed from the washing liquid, it is directed to the boiling vessel 83 through the introducing pipe 94. In the boiling vessel 83 the washing liquid is heated by the heater 88 to its boiling point, and then the gases whose boiling points are lower than the boiling point of the washing liquid are separated from the washing liquid. The degassed washing liquid 87 is directed to the washing vessel 82.

The degassed washing liquid 87 which is around its boiling temperature forms a high-temperature layer on the surface of the washing bath, thereby preventing gases whose boiling point is lower than the boiling point of the washing liquid from dissolving into the washing bath. Thus, the degassed washing bath will not be adversely affected by the surrounding atmosphere.

The overflowing amount of washing liquid which is transferred from the high-temperature zone of the washing vessel 82 is returned to the bottom part 99 of the washing vessel 82 through the circulating pipe 98, which includes the cooling unit 102. After passing through the cooling unit 102 the temperature of the washing liquid is reduced to given constant degrees C. The washing liquid thus cooled is supplied to the bottom part of the washing vessel so that the overlying washing zone may be cooled, thereby enhancing the washing effect.

A temperature controlling pipe 103 branching from the circulating pipe 98 is laid at a level which is lower than the circulating pipe 98, thus making it easy to control the temperature of the washing liquid. While washing an object in the washing zone in the washing vessel the oil or soil is removed from the soiled object to precipitate. Then, the temperature controlling pipe 103 may be used to circulate the washing liquid through the filter and the cooling unit 102 with the aid of the pump 100, thereby removing the precipitation from the washing liquid and supplying the soil-free washing liquid at a given constant temperature to the bottom part of the washing vessel, thus bringing the temperature of the overlying washing zone to the temperature appropriate for washing the object.

As shown in FIG. 6, the regenerating pipe 105 communicates the washing zone between the high-temperature and low-temperature zones 95 and 99 with the vaporizing vessel 84. The washing liquid which is heated by ultrasonic vibration in washing and contains impurities, is transferred to the vaporizing vessel 84 through the regenerating pipe 105, where impurities are separated in terms of their boiling points.

As described above, the washing liquid is heated around its boiling point to separate the dissolved gases in terms of their boiling points. Also, the washing zone of the washing vessel is maintained at a relatively low temperature appropriate for washing. Degassing and temperature control in the washing zone are effective in improving the ultrasonic washing effect and efficiency. The temperature control of washing liquid is effected, and therefore the coexistence of the high- and low-temperature zones in the same washing bath is permitted. Also, in the course of circulation of washing liquid 87 through the circulating pipe 98 with the aid of the pump 100, foreign substances such as dust, oil and the like are removed from the washing liquid 87 by the filter, and at the same time, the washing liquid is cooled by removing the heat generated by ultrasonic vibration with the aid of the cooling unit 102, thereby keeping the washing liquid at a temperature which is appropriate for washing. As a result cavitation and hence washing efficiency can be substantially improved.

In this particular embodiment a single washing vessel is used, but a plurality of washing vessels may be used. Thanks to the use of a boiling vessel for deaeration, the structure of the whole apparatus becomes simple, and still advantageously it requires only a small space. This space saving will be more conspicuous in case of the installation of multi-stage washing system, which is composed of a series connection of washing apparatuses 81.

The low-temperature zone contains precipitate of oil and other impurities whereas the high-temperature zone contains no impurities. The impurity-free washing liquid is circulated to the low-temperature zone through the circulating pipe, thereby reducing the impurity content of the low-temperature zone.

I claim:

1. Ultrasonic washing apparatus comprising at least one washing vessel at a single or multi-washing stages, each containing a washing liquid for washing an object to be cleaned when thrown into the washing vessel, an ultrasonic vibrator for radiating ultrasonic waves into the washing liquid and an oscillator for operating the ultrasonic vibrator characterized in that it further comprises degassing means for removing gas from the washing liquid, thereby enhancing cavitation in the washing liquid when the ultrasonic waves are radiated in the washing liquid, said degassing means comprising a boiling vessel which is put upstream of the washing vessel on the washing liquid supplying side, said boiling vessel being effective in removing from the washing liquid a gas whose boiling point is lower than the boiling point of the washing liquid.

2. Ultrasonic washing apparatus according to claim 1 wherein it further comprises dewatering means 70 upstream of said boiling vessel.

3. Ultrasonic washing apparatus according to claim 1 wherein it further comprises dewatering means 70 upstream of said boiling vessel, vapor condensing unit 68 and vaporizing vessel 61 upstream of the dewatering means 70.

4. Ultrasonic washing apparatus according to claim 1 wherein it further comprises an overflow vessel 73 downstream of said washing vessel 59.

5. Ultrasonic washing apparatus according to claim 1 wherein it further comprises a filter, a cooling unit 79 and a pump 78 series-connected across the bottom of said washing vessel 59 for circulating the washing liquid in said washing vessel by the pump 78.

* * * * *